May 27, 1941.  C. E. MAYNARD  2,243,532
TIRE VULCANIZER
Filed Jan. 26, 1938   3 Sheets-Sheet 1

INVENTOR
CHARLES EDGAR MAYNARD
BY
Chapin & Neal
ATTORNEYS

May 27, 1941.  C. E. MAYNARD  2,243,532
TIRE VULCANIZER
Filed Jan. 26, 1938  3 Sheets-Sheet 2
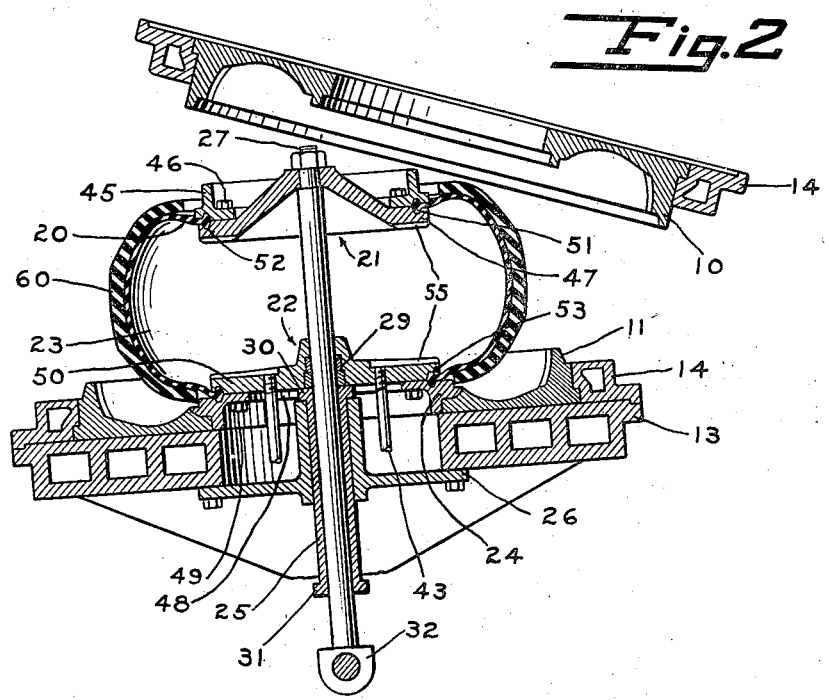
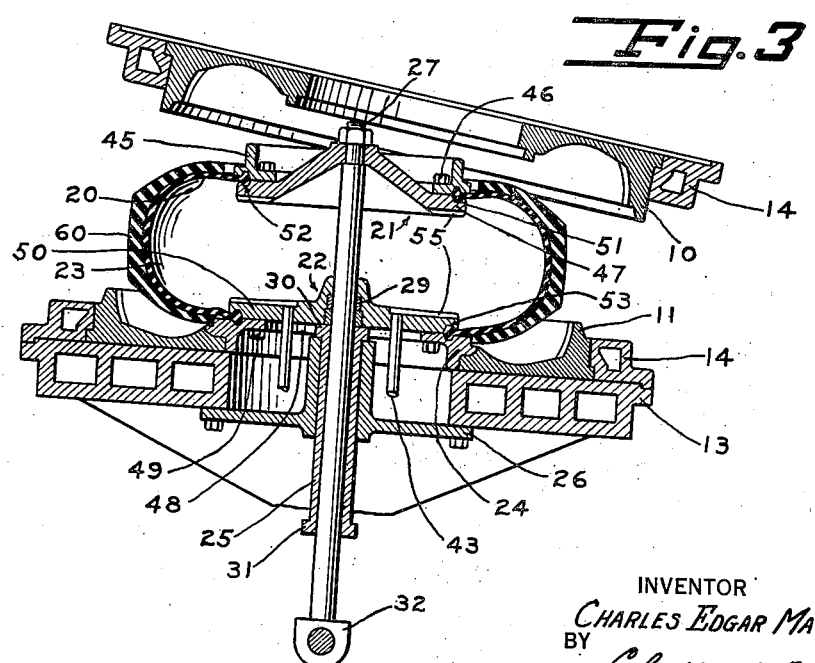
INVENTOR
CHARLES EDGAR MAYNARD
BY
Chapin & Neal
ATTORNEYS May 27, 1941.  C. E. MAYNARD  2,243,532
TIRE VULCANIZER
Filed Jan. 26, 1938   3 Sheets-Sheet 3
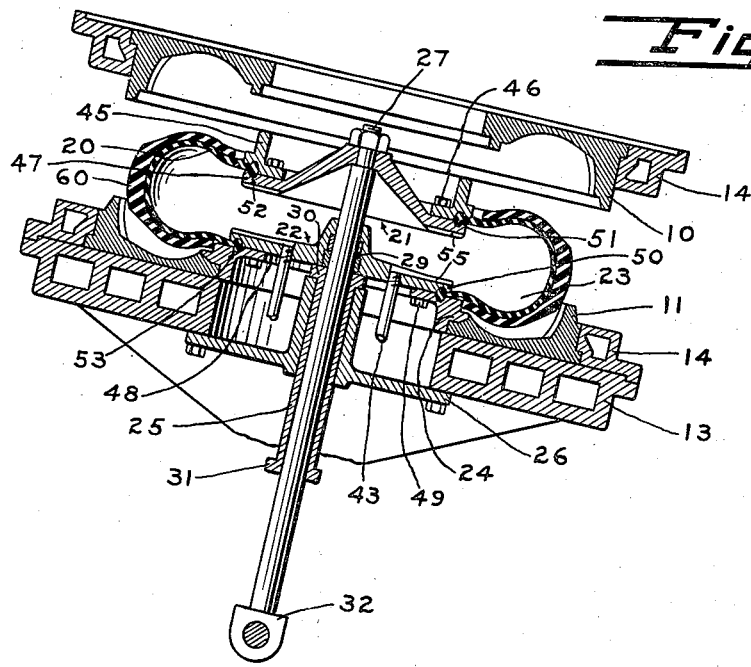
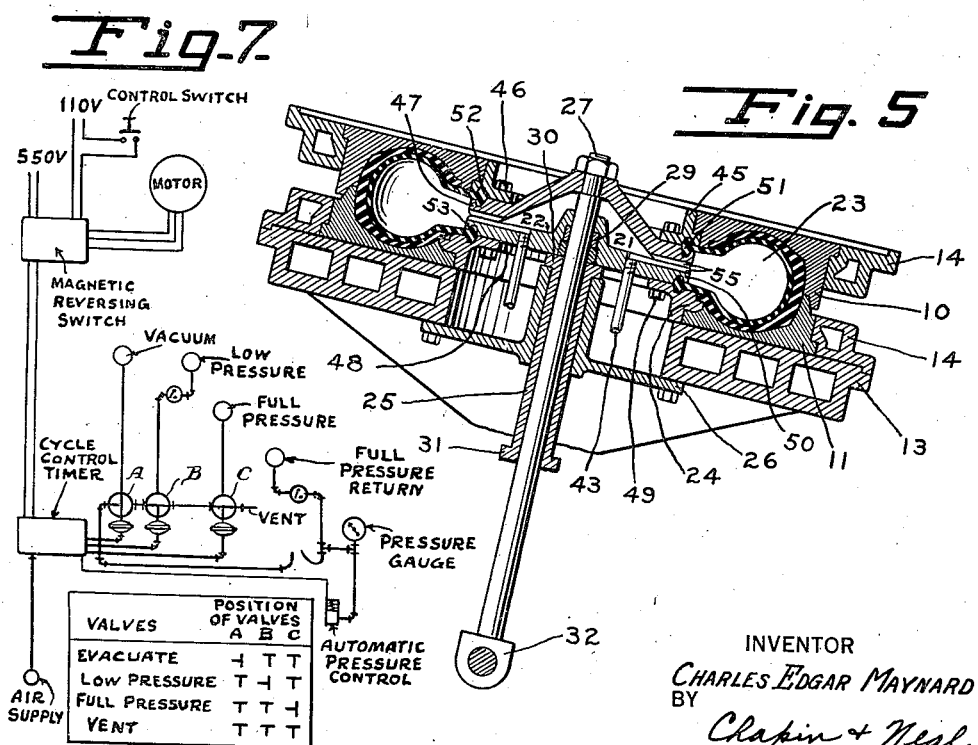
INVENTOR
CHARLES EDGAR MAYNARD
BY
Chapin + Neal
ATTORNEYS Patented May 27, 1941

2,243,532

UNITED STATES PATENT OFFICE 2,243,532

TIRE VULCANIZER

Charles Edgar Maynard, Northampton, Mass., assignor, by mesne assignments, to United States Rubber Company, New York, N. Y., a corporation of New Jersey Application January 26, 1938, Serial No. 186,943

13 Claims. (Cl. 18—17)

This invention relates to the vulcanization of pneumatic tire casings.

Pneumatic tire casings are with few exceptions constructed of some form of cord fabric which necessitates that they be vulcanized under internal fluid pressure. It is the general practice at the present time to supply this internal pressure by inserting an annular tube, commonly termed a "bag", inside of the tire casing, to which fluid under pressure is admitted after the casing and its bag have been enclosed in a suitable mold. When, as is a common practice with all except the larger and heavier tires, the casing is built in flat or semi-flat form, it is necessary to shape the casing in substantially tire form before the bag is inserted. After the vulcanization is completed it is necessary to remove the bag. These shaping, bagging, and unbagging operations are well known and need not be described in detail. The various steps involved are in themselves laborious and time consuming and, while various means have been employed to lighten the labor, these various operations represent a very substantial expense in preparing the casings for vulcanization and in removing the bags after vulcanization. Other elements of expense are involved in the cost of making the air bags and maintaining them in service.

It is an object of my invention to eliminate the shaping and bagging of the casings as steps preparatory to placing the casings in the vulcanizers for curing.

It is a further object to provide means which will both shape the tire and serve as a fluid pressure bag during the vulcanization of the casing, which means may form an element of the vulcanizer so that the casing may be placed in the vulcanizer while still in flat or semi-flat form, and when cured is removed from the vulcanizer in unbagged condition.

Other and further objects will be made apparent in the following specification and claims.

In the accompanying drawings which illustrate one embodiment of the invention—

Figure 1:
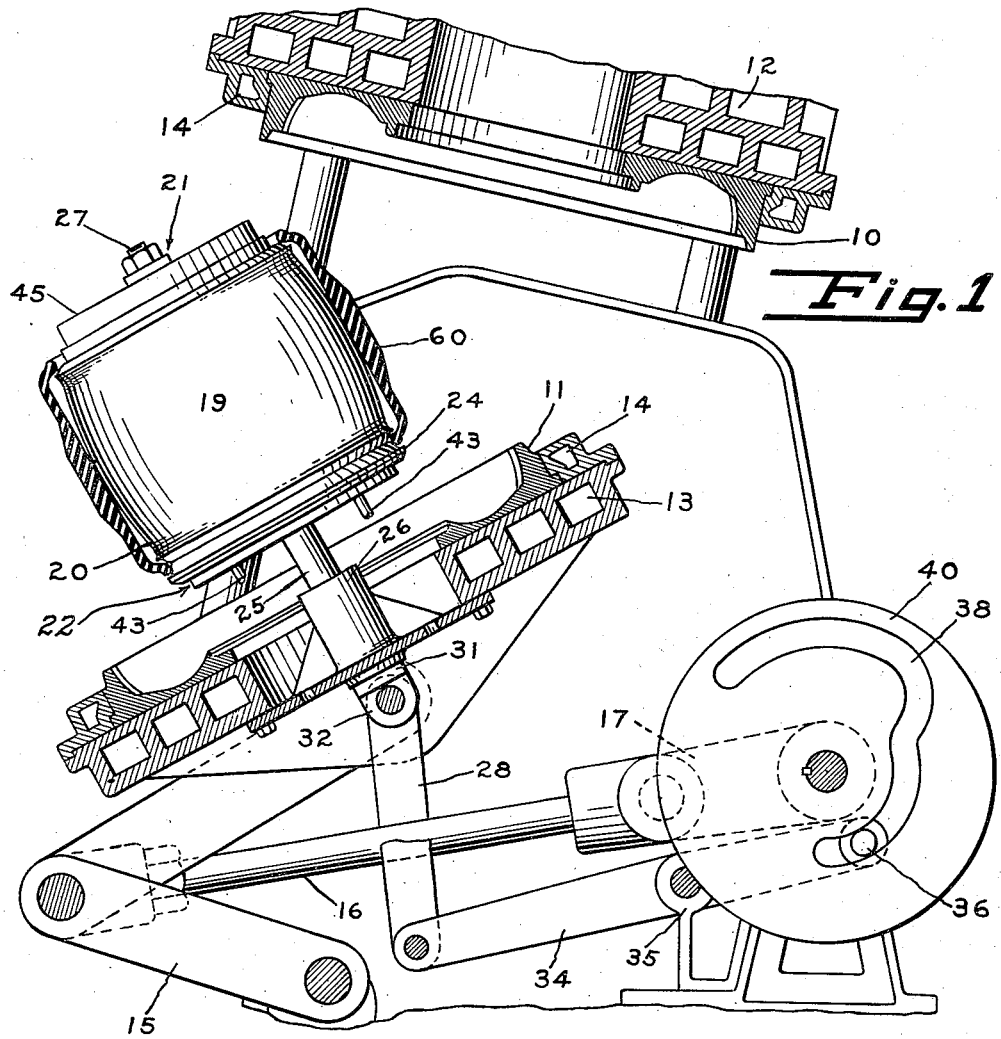
Figure 6:
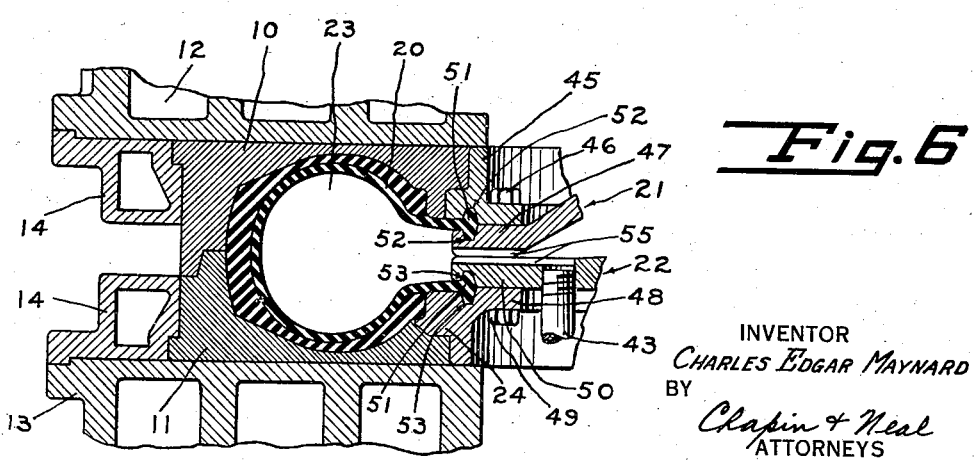

Fig. 1 is a side view partially in section and with parts broken away showing a vulcanizing press according to my invention, the parts being in open or loading position;

Figs. 2, 3, 4, and 5 are similar views showing successive stages in the closing of the press, Fig. 5 showing the press closed;

Fig. 6 is a fragmentary sectional view on a larger scale to better show the relation of the parts when the mold is closed; and Fig. 7 is a diagram showing suitable control means.

Referring to the drawings, more particularly Fig. 1, reference characters 10 and 11 indicate upper and lower mold halves respectively secured to upper and lower press platens 12 and 13. The press structure including the platens and the mechanism for operating them may take any conventional or other suitable form and only such parts are shown or indicated as are necessary to an understanding of the invention.

It will be understood that the platens are provided with means for heating the mold halves such as a system of steam chambers, a portion of such a system being indicated at 14.

As shown, the upper platen is stationary, the lower platen moving through the several stages shown in Figs. 1 to 5 inclusive, the closing movement being effected by a toggle 15 actuated by a link 16 connected to a power driven crank indicated at 17. The tilting of the lower platen may be effected by suitable guides or linkages not shown.

The pressure bag member, indicated generally at 19, comprises a flexible, radially expansible cylinder or tubular member 20, formed of a flexible elastic material such as is now used for bags, having its edges connected as later more fully described to circular heads 21 and 22, forming a closed chamber 23. The lower head 22 carries an annular bead molding ring 24 which, when the mold is closed, forms the bead molding portion of the lower mold half.

The lower head 22 is supported on a cylindrical sleeve member 25 sliding in a cylindrical guide member 26 secured to the lower press platen 13. The upper head 21 is secured to a rod 27 which passes through sleeve 25 and lower head 22, which is provided with a suitable stuffing box 29, and is connected at its lower end to an operating link 28. The upper end of sleeve 25 is provided with a flange or collar 30 upon which the lower head 22 rests and the lower end is provided with a collar 31, which, by its engagement with guide 26, limits the upward movement of the sleeve. The lower end of rod 27 is enlarged as at 32 to form a shoulder which engages flange 31 to limit the upward movement of the rod 27.

The operating linkage for rod 27 may take any suitable form. As shown, link 28 is connected to one end of a lever arm 34 pivoted intermediate to ends to the frame at 35, the other end of which carries a cam roll 36 riding in cam groove 38 of a cam 40.

The lower head 22 is provided with suitable pipe connections 43 by which fluid pressure may be supplied to, and preferably circulated through, the chamber 23. The preferred pressure fluid is hot water and it will be understood that the introduction and exhaustion of the pressure to and from chamber 23 will be controlled by suitable valves in the lines supplying pipes 43.

As shown in Fig. 6, the head 21 comprises an annular ring 45 secured by bolts 46 to a disk member 47, and head 22 similarly comprises an annular ring 48 which, as shown is integral with head ring 24, bolted at 49 to a disk member 50. The flexible cylindrical member 20 is provided at each edge with flanges or beads 51. The bead at the upper edge of member 20 engages in complementary grooves 52 formed in members 45—47 of head 21, and the bead at the lower edge is engaged in similar grooves 53 formed in members 48—50 of the lower head. The edges of member 20 are thus tightly clamped to the heads. The disk members 47 and 50 are provided with one or more sets of mating grooves 55 providing communication between the portion of chamber 23 between the heads and the portion within the member 20 when the heads are adjacent and member 20 in tire shaping position, as shown in Fig. 6.

In Fig. 7 is diagrammatically shown a suitable automatic control system employing any suitable conventional type of cycle control timer which is set in motion upon energizing the motor or other means which powers the press and effects the successive settings of valves A, B, and C, as indicated.

In Fig. 1 and Fig. 7 the parts are shown in their positions at the start of the operation. As there shown, the vulcanizing press is open, the heads 21 and 22 are at their points of maximum separation, thus holding the member 20 in substantially cylindrical form, and bead ring 24 is raised from the lower mold member. When the press is opened the pressure is relieved or evacuated from chamber 23, as indicated diagrammatically in Fig. 7, or at least is maintained at a safe minimum. With the parts in this condition a raw tire casing 60, still in the flat or semi-flat form in which it was built, is telescoped over the member 20. The bead ring 24 may be used as a stop or guide for properly centering the casing on the cylinder.

The actuating mechanisms are then started, the first movement being to lower the heads 21 and 22 and the cylinder 20 bodily until the bead ring 24 seats in the lower mold half. Rod 27 continues to be drawn downwardly by the action of cam 40, thus decreasing the distance between the heads and expanding the cylinder 20 outwardly as shown in Fig. 2. At the same time the press platens may be moving toward closed position. Figs. 2 and 3 show further advances of these movements with the previously flat or semi-flat casing approaching tire shape. During this time fluid pressure may and preferably is admitted to the chamber 23 (low pressure Fig. 7) to assist in the shaping of the tire. After the heads 21 and 22 are brought together, as shown in Fig. 5, or simultaneously therewith, the press platens move to complete mold closing position, at which time full pressure (see Fig. 7) is admitted to the chamber 23 and maintained during the vulcanizing period.

Upon completion of the vulcanizing of the casing and after the pressure within chamber 23 is vented and reduced to a safe minimum, the actuating means is operated to return the parts to the position shown in Fig. 1. As the heads 21 and 22 separate, the cylindrical member 20 is stripped from the casing which is now vulcanized in tire form, and at the completion of the cycle the tire is left on the cylinder from which it is easily removed.

As will be evident, the pressure bag member 19 has served both to shape the casing and as a pressure bag during the cure and that the cured tire is removed in an unbagged condition. It will also be evident that the presence and operation of the member 19 do not require any substantial modification of the press structure or its operation. Preferably the closing and opening of the press, the admission and discharge of the fluid pressure will be automatically timed and controlled (see Fig. 7) in substantial accordance with the best present practice and, as will be evident, the operation of member 19 can be made to accord with the timing of any particular press arrangement merely by properly shaping the cam 40 and the selection of properly dimensioned guiding linkages.

It will also be noted that member 20 may be easily disconnected from heads 21 and 22 for inspection and repair of its inner surface.

As above mentioned, the member 19 serves as the pressure bag during the cure. Member 19, however, performs further functions beyond the capacity of the conventional pressure bag. Member 19 is structurally and operatively connected to the other mold members and acts with them to completely enclose the tire. Because the member 19 has a predetermined relation to the other mold members, it assures proper positioning of the tire with respect to the outer mold members. The various types of defects due to improper positioning of the tire in the mold by the operator are avoided. Similar defects due to improper bagging of the tire are also avoided and the time and labor heretofore necessary in inspecting against and attempting to correct these conditions constitute a further saving in operating costs.

Member 19, like the other mold members, may be kept at a constant or controlled temperature, resulting in more accurate and uniform cures than is possible with pressure bags which are subject to cooling during their removal from the tires and during the variable periods between their removal from one tire and their insertion in the other. By my invention heat applied to the inside of the casing may for the first time be made a reliable and predetermined factor in the vulcanizing operation since the mold heat is not called upon to raise and maintain the temperature of the bag. The wall of member 20 may be made thinner than that of a pressure bag since it is never subjected to the transverse buckling and irregular and sharp bending to which a pressure bag is subjected in placing it in a tire casing. The decreased wall thickness of member 20 as compared with the pressure bags of the prior art results in more rapid and efficient heat transference. The uniform character of the distortion to which member 20 is subjected in moving from cylindrical or tubular form to tire form and back makes it possible to construct it to particularly resist known strains repeated in a known manner.

Preferably the member 20 is molded or formed in the shape it assumes during the vulcanizing operation so that the "distortion" imposed is that of drawing it from "tire shape" to cylindrical shape. The tendency of the member 20 to assume its original tire shape, assists the fluid pressure in shaping the tire casing.

My invention provides a new and important factor in the method of shaping the tire casing from band to tire form—namely, the heating of the tire casing prior to and during the shaping operation. The heat of member 19 is applied directly against the cord carrying portion of the casing so that the rubber matrix in which the cords are embedded is to some extent softened, permitting the rearrangement of the cords which takes place as the casing assumes tire shape to take place with somewhat less resistance from the rubber.

I claim:

1. A vulcanizer for pneumatic tire casings which comprises opposed press members at least one of which is movable toward and from the other, said members including annular mold members adapted when the press is closed to form a tire molding cavity, means for closing and opening said press, tire shaping means, means for opening said press, tire shaping means, means for supporting said shaping means intermediate and spaced from the press members when the latter are in open position, said tire shaping means including a pair of heads, a flexible radially expansible tubular member connecting said heads to form therewith a cylindrical chamber, means to admit fluid under pressure to said chamber, a rod connected to one of said heads and extending through said chamber and the opposite head, and means acting on said rod to decrease the distance between the heads concurrently with the admission of fluid pressure to the chamber to thereby expand the tubular member against the inner surface of a band shaped tire casing and expand the casing into substantially tire form between said mold members to be enclosed by the latter upon closure of the press.

2. In a vulcanizer for pneumatic tire casings having opposed press members at least one of which is movable toward and from the other, said members including annular mold members adapted, when the press is closed, to form a tire molding cavity, and means for closing and opening the press, a pair of circular heads connected by a flexible radially expansible member forming with the heads a substantially cylindrical chamber, when the press is open, upon which a substantially band-shaped tire casing may be telescoped, a movable support for said chamber extending through the central opening of one of the mold members, means to admit fluid under pressure to and exhaust it from said chamber, and means including said support to automatically move one of said heads toward the other as fluid pressure is admitted to the chamber to expand the band-shaped tire casing to tire shape prior to the complete closure of the press.

3. In a vulcanizer for pneumatic tire casings having opposed press members at least one of which is movable toward and from the other, said members including annular mold members adapted, when the press is closed, to form a tire molding cavity, and means for closing and opening the press, a pair of circular heads connected by a flexible radially expansible member forming with the heads a substantially cylindrical chamber when the press is open, a movable support for said chamber extending from one end of the chamber through the central opening of one of the mold members, the head at the other end of the chamber having an overall diameter less than the inside bead diameter of the casing to be vulcanized to permit a band-shaped casing to be telescoped over the chamber, means to admit fluid under pressure to and exhaust it from the chamber and means including said support to automatically move one of said heads toward the other as fluid pressure is admitted to the chamber to expand the band-shaped casing to tire shape prior to the complete closure of the mold.

4. In a vulcanizer for pneumatic tire casings having opposed press members at least one of which is movable toward and from the other, said members including annular mold members adapted when the press is closed to form a tire molding cavity, and means for closing and opening the press; a deformable and expansible fluid pressure chamber, a movable support for said chamber extending through the central opening of one of the mold members, means to admit under fluid pressure to and exhaust it from the chamber and means including said support acting on opposite ends of the chamber to decrease its dimension in a direction substantially at right angles to the plane of the edge of the last mentioned mold member prior to the application of pressure to the chamber by the mold members and simultaneously with the admission of fluid under pressure to the chamber, whereby the chamber is distorted and expanded radially against the inner surface of a substantially band-shaped casing placed about said chamber to shape said casing into substantially tire form.

5. In a vulcanizer for pneumatic tire casings having opposed press members at least one of which is movable toward and from the other, said members including annular mold members adapted when the press is closed to form a tire molding cavity, and means for closing and opening the press; a deformable and expansible fluid pressure chamber, a movable support for said chamber extending through the central opening of one of the mold members, means including said support acting on opposite ends of the chamber to decrease its dimension in a direction substantially at right angles to the plane of the edge of the last mentioned mold member prior to the application of pressure to the chamber by the mold members, to distort the chamber radially against the inner surface of a substantially band-shaped casing placed about said chamber to shape the latter to substantially tire form, and means to admit fluid under pressure to the chamber during the shaping of the casing and after the closure of the mold.

6. In a vulcanizer for pneumatic tire casings having opposed press members at least one of which is movable toward and from the other, said members including annular mold members adapted when the press is closed to form a tire molding cavity, and means for closing and opening the press, a pair of heads connected by a flexible, deformable, and radially expansible tubular member forming with the heads a substantially cylindrical chamber when the press is open, upon which a substantially band-shaped tire casing may be telescoped, a movable support for said chamber extending through the central opening of one of the mold members, means to admit fluid under pressure to and exhaust it from the chamber and means including said support, to decrease the distance between the heads at a predetermined rate in advance of the closure of the press and simultaneously with the admission of fluid under pressure to the chamber, whereby the tubular member is deformed and expanded against the casing telescoped thereon to shape the latter to tire form to be enclosed by the mold members upon closure of the press.

7. In a vulcanizer for pneumatic tire casings having opposed press members at least one of which is movable toward and from the other, said members including annular mold members adapted when the press is closed to form a tire molding cavity, and means for closing and opening the press, upper and lower heads connected by a flexible, deformable and radially expansible tubular member forming with the heads a substantially cylindrical chamber when the press is open upon which a substantially band-shaped tire casing may be telescoped, means to admit fluid under pressure to and exhaust it from said chamber, a support for said chamber extending through the central opening of one of said mold members, said support including a guide carried by the adjacent press member and engageable by the lower head, means slidably mounted in said guide and extending through the lower head and said chamber and secured to the upper head, and mechanism to move said last-named means relative to the guide to move the heads toward each other as the press closes, to deform said tubular member against the casing telescoped thereon to shape the latter to tire form.

8. A device for shaping a tire casing from band to substantially tire form which comprises a pair of heads, a flexible, deformable and radially expansible tubular member connecting said heads and forming therewith a substantially cylindrical chamber upon which a substantially band-shaped tire casing may be telescoped, means to admit fluid under pressure to and exhaust it from the chamber, a movable member connected to one of said heads and extending through said chamber and the opposite head, and means acting on said last-named member to move it to decrease the distance between the heads.

9. A vulcanizer for pneumatic tire casings which comprises, opposed press members at least one of which is movable toward and from the other, said members including annular mold members adapted, when the press is closed, to form a tire molding cavity, means for closing and opening said press, tire shaping means carried by one of said press members and including a substantially cylindrical inflatable expansible member, movable means for supporting the shaping means intermediate and spaced from the mold members when the press is open, means operable in timed relation with the press closing means to move said movable member to progressively deform said expansible member into the shape approximating that of the inner surface of a tire, whereby a band-shaped tire casing placed about said expansible member may be deformed into a shape approximating a tire between said mold members to be enclosed by the latter upon closure of the press and means to admit fluid pressure to said inflatable expansible member while it is being deformed and after closure of the mold to expand said expansible member and tire casing.

10. A vulcanizer for pneumatic tire casings which comprises opposed press members at least one of which is movable toward and from the other, said members including annular mold members adapted when the press is closed to form a tire molding cavity, the bead portion of one of said mold members being formed as a bead ring separable from the member, tire shaping means including a pair of heads connected by a flexible distortable and radially expansible tubular member which forms with said heads a substantially cylindrical chamber, one of said heads being secured concentrically to and within the said separable bead ring mold portion, means to open and close the press, movable supporting means for the separable bead ring and cylindrical member to position the bead ring and cylindrical member intermediate and spaced from the mold members when the press is open, means to move said movable supporting means to seat said bead ring in the mold member of which it forms a portion and to decrease the distance between said heads, and means to admit fluid under pressure to said chamber as the distance between said heads is decreased to expand said tubular member against the inner surface of a band-shaped tire casing, placed about said chamber, to thereby expand the casing into approximately tire shape between said mold members to be enclosed by the latter upon closure of the press.

11. In a vulcanizer for pneumatic tire casings having opposed press members at least one of which is movable toward and from the other, said members including annular mold members adapted, when the press is closed, to form a tire molding cavity, means for closing and opening said press; means for shaping a tire casing from band to substantially tire form carried by one of the press members and including a pair of heads, a flexible radially expansible annular member connecting said heads to form a chamber, said annular member having a normal shape approximating the shape of a finished tire casing, means to separate the heads to draw said annular member into cylindrical form to permit a tire casing in band form to be telescoped thereon, said means being thereafter operable in timed relation with the press closing means to decrease the distance between the heads to permit the annular member to reassume tire shape and means to simultaneously admit fluid under pressure to said chamber, to thereby expand the casing telescoped thereon to substantially tire form.

12. In a vulcanizer for pneumatic tire casings having opposed press members at least one of which is movable toward and from the other, said members including annular mold members adapted, when the press is closed, to form a tire molding cavity, means for closing and opening said press; a pair of heads connected by a flexible radially expansible annular member to form a chamber, said annular member having a normal shape approximating the shape of a finished tire casing, a movable support for said chamber, said support including a linkage connected to one of the heads and extending through said chamber and the opposite head, and means for actuating said linkage to maintain the heads separated when the press is open to thereby draw said annular member into cylindrical form to permit a tire casing in band form to be telescoped thereon, said means being thereafter operable to decrease the distance between the heads concurrently with the closing movement of the press to permit the annular member to reassume tire shape.

13. A device for shaping a tire casing from band to substantially tire form which comprises a pair of heads, a flexible radially expansible annular member connecting said heads to form a chamber, said member having a normal shape approximating the shape of a finished tire casing, means to separate the heads to draw said member into cylindrical form to permit a tire casing in band form to be telescoped thereon, said means being thereafter operable to decrease the distance between the heads to permit the member to reassume tire shape, and means to admit fluid under pressure to and exhaust it from the chamber.

CHARLES EDGAR MAYNARD.